Jan. 2, 1951 P. A. DRISCOLL 2,536,269
AUTOMATICALLY ADJUSTING BRAKE
Filed Feb. 21, 1946 2 Sheets-Sheet 1

INVENTOR.
PAUL A. DRISCOLL
BY
T. J. Plante
ATTORNEY

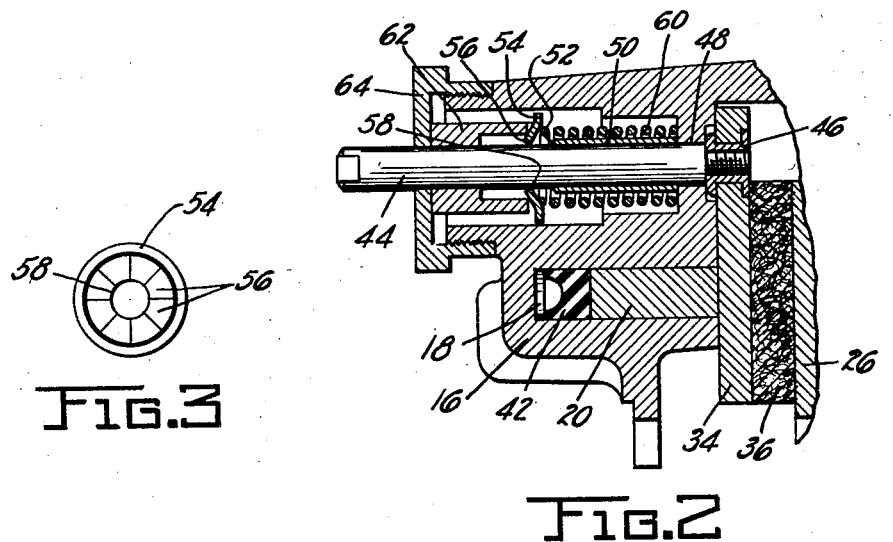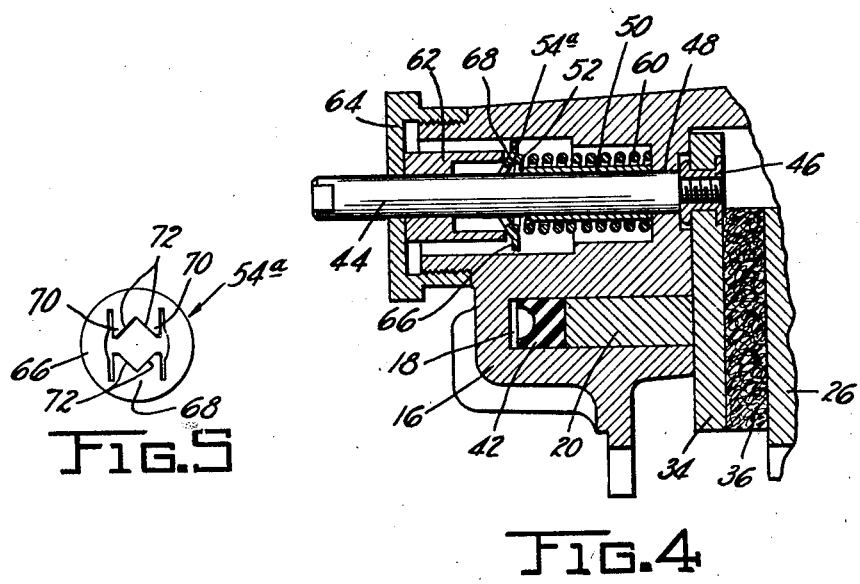

Patented Jan. 2, 1951

2,536,269

UNITED STATES PATENT OFFICE 2,536,269

AUTOMATICALLY ADJUSTING BRAKE

Paul A. Driscoll, South Bend, Ind., assignor to Bendix Aviation Corporation, South Bend, Ind., a corporation of Delaware Application February 21, 1946, Serial No. 649,282

6 Claims. (Cl. 188—72)

This invention relates to automatically adjusting brakes, and is particularly concerned with self-adjusting brakes of the disc type.

The general object of the present invention is to provide an automatic adjustment mechanism for a disc brake which will be particularly efficient and reliable in operation, and yet simple in construction.

Other and more specific objects of the present invention will become apparent during the course of the following description, wherein reference is had to the accompanying drawings, in which:

Figure 2 is a close-up of the automatic adjuster of Figure 1;

Figure 3 is an end view of the spring washer which forms an important component of the automatic adjuster;

Figure 4 shows a modified version of my improved automatic adjuster; and

Figure 5 shows an end view of the spring washer of Figure 4.

Figure 1:
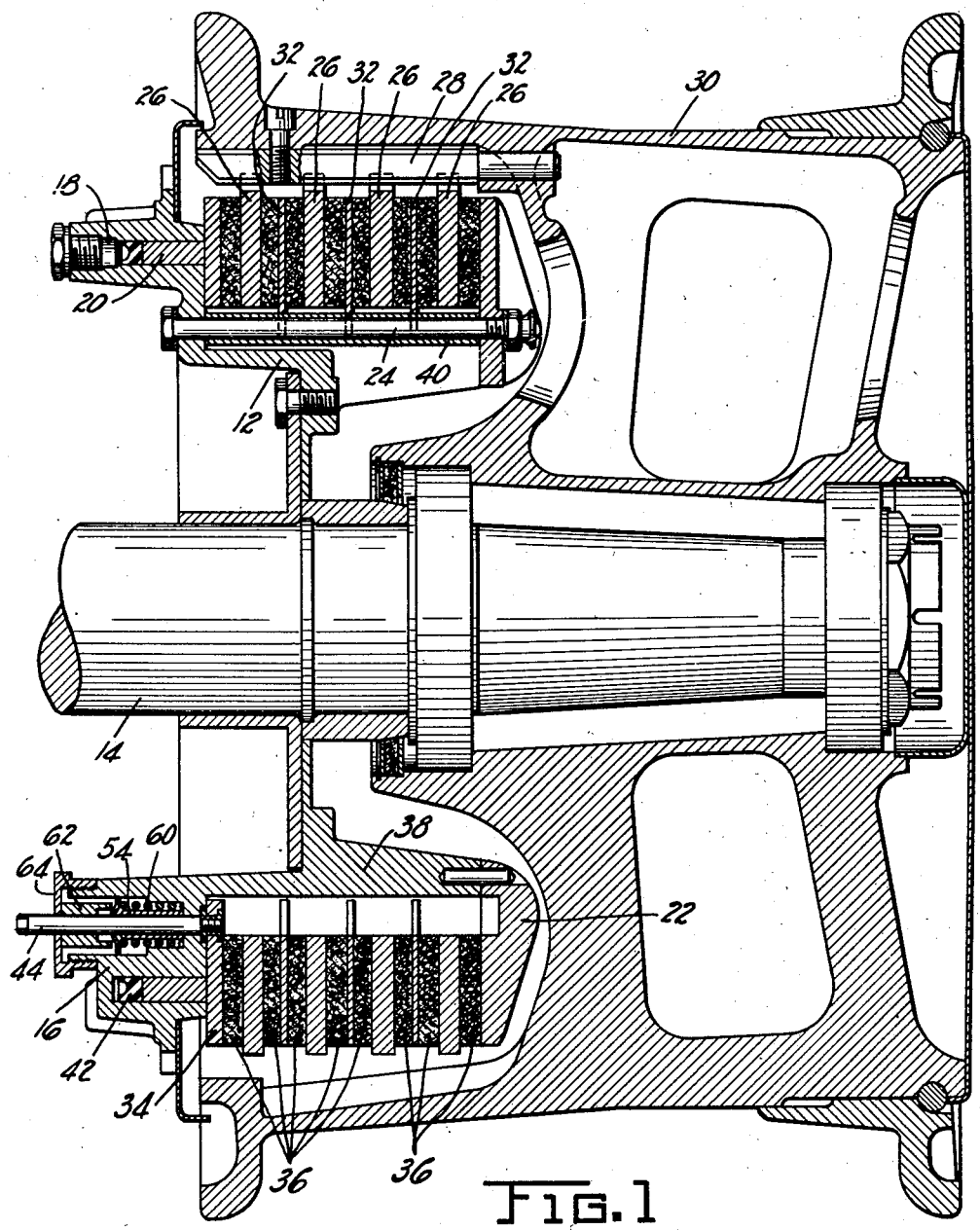
Figure 1 is a vertical section taken through a disc brake assembly which incorporates one version of my improved automatic adjuster.

Referring first of all to the construction shown in Figures 1 to 3, the disc brake seen therein comprises a carrier 12 which is secured to the non-rotating axle 14, an outwardly extending flange 16 integral with the carrier 12 which provides a chamber 18 to receive an annular piston 20, a backing plate 22 which is secured to carrier 12 by means of a plurality of circumferentially spaced axially extending bolts 24, one or more rotor discs 26 which are driven by means of a plurality of axially extending keys 28 carried by the wheel 30, one or more stator discs 32 interleaved with the rotor discs 26, and a pressure plate 34 which is the stator disc nearest the flange 16. Suitable brake lining 36 may be secured to the left face of the backing plate 22, to both faces of the stator discs 32, and to the right face of pressure plate 34. Backing plate 22 is held against an axial flange 38 of brake carrier 12, and is prevented from axial movement in the opposite direction by the bolts 24. The rotor discs 26 are all axially movable along the keys 28, and the stator discs 32 and pressure plate 34 are all axially movable along the anchor sleeves 40 which encircle the bolts 24.

The brake is applied by admitting fluid under pressure to chamber 18, which fluid acts against annular sealing member 42 and piston 20 to move the piston and pressure plate 34 toward the right, bringing the several frictional surfaces of the brake into engagement to inhibit rotation of the wheel 30. As the brake linings 36 wear, due to successive applications of the brake, the initial travel of pressure plate 34 required to bring the frictional surfaces into engagement will gradually increase, unless provision is made for adjusting the released position of the pressure plate to reduce the brake running clearance.

I propose to provide automatically operating means for adjusting the released position of pressure plate 34 and thereby maintaining the brake running clearance substantially constant. The means for automatically adjusting the brake preferably includes a plurality of adjusting devices located at equal intervals around the circumference of the brake. Since I prefer that each brake return spring be a component of one of the adjusting devices, it is desirable that the number of adjusting devices be equal to the number of return springs normally required. In other words, if 12 return springs are normally considered necessary to accomplish the function of retracting the pressure plate, then it is preferable that 12 adjusting devices be used, although it will, of course, be apparent that the scope of the invention is in no way limited to, or concerned with, the number of adjusting devices used.

Because the several adjusting devices are identical, the description of one will suffice for all. Referring particularly to Figures 2 and 3, the adjusting device comprises an axially extending pin 44 which is secured to pressure plate 34 and which is axially movable therewith, the end of the pin being screwed into a bushing 46, which in turn is riveted to the plate 34. The pin 44 extends outwardly through an opening 48 in the wall of the carrier flange 16, and a sleeve 50 is loosely carried by pin 44, with its inner end engaging the wall of flange 16. The outer edge 52 of sleeve 50 is preferably beveled, as shown, for a reason which will hereinafter appear.

A washer 54, which is spaced outwardly from the outer end 52 of sleeve 50, encircles pin 44. This washer has a plurality of inwardly extending resilient prongs 56 which engage the outer cylindrical surface of pin 44. As shown, the prongs 56 are inclined at a slight angle away from the plane of the annular part of the washer, with the result that the edges 58 of the prongs constitute the sole contact of the washer with the pin. From this it will be apparent that any force exerted tending to move washer 54 toward the left will cause the edges 58 to grip the pin 44 tightly and move the pin along with the washer. Also, if a force is exerted on the pin 44 tending to move it to the right, the same gripping effect will occur between the washer and the pin and the washer will be moved toward the right.

In the latter case, i. e., when movement of the pin causes movement of the washer, the inner portion of the washer prongs will eventually contact the beveled end surface of sleeve 50. When this occurs, the pressure between the washer prongs and the pin will be overcome sufficiently to permit axial movement of the pin relative to the washer, but any tendency of the washer to be displaced away from the end of the sleeve will immediately cause the washer prongs to dig into the pin and reestablish the direct connection between the pin and washer.

A return spring 60 is compressed between the wall of flange 16 and the washer 54. Outward movement of washer 54 under the influence of spring 60 is limited by a sleeve 62 which abuts against a nut 64 screwed onto the flange 16.

Operation of the adjusting device is as follows. In released position, spring 60 holds washer 54 against the end of sleeve 62 and thus controls the position of pin 44, which in turn serves as a positioning member for pressure plate 34. When force is applied through piston 20 to move pressure plate 34 toward the right, the accompanying axial movement of pin 44 causes washer 54 to move toward the right, compressing spring 60. If the wear of the brake linings has been sufficient to necessitate additional movement of pin 44 after washer prongs 56 have engaged the outer end of sleeve 52, then pin 44 is permitted to move axially toward the right with respect to washer 54, because contact of washer prongs 56 with the end 52 of sleeve 50 temporarily relieves the force of engagement between the washer prongs and the pin.

After pin 44 has moved the required distance axially relative to washer 54, release of the brake applying pressure permits spring 60 to return washer 54 to released position against the edge of sleeve 62, pin 44 being forced to the left by movement of the washer, but only to the extent of the predetermined brake running clearance, which is equal to the maximum clearance between the washer prongs and the beveled edge 52 of sleeve 50. Because of the axial movement of pin 44 with respect to the washer 54, pressure plate 34 will not be withdrawn to its initial position, and a slight clearance will be maintained between the flange 16 and the pressure plate. Since there is no force tending to return pressure plate 34 and piston 20 beyond the adjusted position, and since there is considerable resistance to such movement of the piston and plate, the adjusted position will be maintained and the running brake clearance will be kept substantially constant, thereby conserving travel in the pressure creating end of the fluid system, it being assumed that the additional fluid required to fill the expanded chamber 18 is drawn from the usual fluid reservoir. The resistance opposing any return movement of piston 20 and pressure plate 34 beyond the adjusted position is primarily due to the friction of annular seal 42 and the pressure head of the fluid in chamber 18.

From the foregoing it will be seen that the length of spring 60 in retracted position remains constant, thereby avoiding the disadvantage which is present when a disc brake adjustment reduces the working length of the return spring. Furthermore, it will be apparent that the automatic adjustor is simple and inexpensive in construction, and yet positive and reliable in operation.

Figures 4 and 5 illustrate an automatic adjusting mechanism which is substantially the same as the device of Figures 1 to 3, except for the construction of the friction washer. Instead of using a friction washer constructed in the manner of member 54 of Figures 1 to 3, the automatic adjustor of Figures 4 and 5 includes a washer of the type referred to as a "Tinnerman" washer. The "Tinnerman" washer, which bears the reference numeral 54a, consists of an annular portion 66, and two integral inwardly extending arms 68 which are inclined with respect to the plane of annulus 66 and each of which is constituted by two prongs 70. Frictional engagement between pin 44 and the washer 54a occurs at four points, the four points of engagement being provided by the inner surfaces 72 of the four prongs 70. As in the device of Figures 1 to 3, contact of the end 52 of sleeve 50 with the springs 72, temporarily relieves the gripping action, and permits relative axial movement of pin 44 with respect to the washer.

Although a particular embodiment of my invention has been described, it will be understood by those skilled in the art that the object of the invention may be attained by the use of constructions different in certain respects from that disclosed without departing from the underlying principles of the invention. I therefore desire by the following claims to include within the scope of my invention all such variations and modifications by which substantially the results of my invention may be obtained through the use of substantially the same or equivalent means.

I claim:

1. An automatically adjusting disc brake comprising a carrier, a backing plate, one or more rotor discs located between the carrier and the backing plate, one or more stator discs interleaved with the rotor discs, including a pressure plate nearest the carrier, means supported by the carrier for applying pressure to said pressure plate and thereby axially compressing the brake discs, a plurality of circumferentially spaced axially extending pins secured to the pressure plate and each extending through an opening in the carrier, a sleeve carried by each pin outside the carrier, the inner end of each sleeve engaging the carrier wall, a washer encircling each pin and normally spaced outwardly from the outer end of the respective sleeve, each washer having inwardly projecting resilient prongs which are bent slightly away from the plane of the washer and which engage the cylindrical outer surface of the respective pin, said prongs normally causing each washer to move axially with its pin until the prongs engage the outer end of the sleeve, after which the pin moves axially relative to the washer, a return spring encircling each sleeve and compressed between the carrier wall and the respective washer to urge the washer and its pin outwardly, said prongs insuring that outward movement of each washer is always accompanied by outward movement of the respective pin, a second sleeve carried by each pin arranged to limit outward movement of the respective washer, and a stop member engaging each of said second sleeves and supported on the carrier.

2. An automatically adjusting disc brake comprising a carrier, a backing plate, one or more rotor discs located between the carrier and the backing plate, one or more stator discs interleaved with the rotor discs, including a pressure plate nearest the carrier, means supported by the carrier for applying pressure to said pressure plate and thereby axially compressing the brake discs, a plurality of circumferentially spaced axially extending pins secured to the pressure plate and each extending through an opening in the carrier, a sleeve carried by each pin outside the carrier, the inner end of each sleeve engaging the carrier wall, a washer encircling each pin and normally spaced outwardly from the outer end of the respective sleeve, each washer having inwardly projecting resilient prongs which are bent slightly away from the plane of the washer and which engage the cylindrical outer surface of the respective pin, said prongs normally causing each washer to move axially with its pin until the prongs engage the outer end of the sleeve, after which the pin moves axially relative to the washer, a return spring encircling each sleeve and compressed between the carrier wall and the respective washer to urge the washer and its pin outwardly, said prongs insuring that outward movement of each washer is always accompanied by outward movement of the respective pin, and means for limiting the outward movement of the several washers.

3. For use in a disc brake having an axially fixed member and an axially movable member which moves a distance at least partially dependent upon the amount of brake wear, means for automatically changing the released position of the axially movable member to maintain a substantially constant brake clearance comprising an axially extending pin secured to the axially movable member, a sleeve carried by said pin and engaging the fixed member at one end, a washer encircling said pin and normally spaced from the opposite end of the sleeve, said washer having inwardly projecting resilient prongs which are at an angle to the plane of the washer and which engage the outer surface of the pin, said prongs normally causing the washer and pin to move together axially, except when the washer contacts the end of the sleeve, a return spring encircling the sleeve and compressed between the fixed member and the washer, and means limiting the extent of movement of said washer and pin under the influence of said spring.

4. For use in a disc brake having an axially fixed member and an axially movable member which moves a distance at least partially dependent upon the amount of brake wear, means for automatically changing the released position of the axially movable member to maintain a substantially constant brake clearance comprising a positioning member which controls the released position of said axially movable member, a washer having inwardly projecting prongs at an angle to the plane of the washer which engage the outer surface of the positioning member and which normally cause the washer and positioning member to move together axially, rigid means engageable by the prongs of said washer for relieving the engaging pressure of said prongs on said positioning member after a predetermined axial movement of the axially movable member, a return spring compressed between the fixed member and the washer, and means engageable with said washer limiting the extent of movement of said washer under the influence of said spring to adjust the released position of the positioning member relative to the fixed member.

5. For use in a disc brake having an axially fixed member and an axially movable member which moves a distance at least partially dependent upon the amount of brake wear, means for automatically changing the released position of the axially movable member to maintain a substantially constant brake clearance comprising a positioning member which controls the released position of said axially movable member, a washer having inwardly projecting prongs at an angle to the plane of the washer which engage the outer surface of the positioning member, and which normally cause the washer and positioning member to move together axially, means engageable by said prongs for relieving the engagement of said prongs with said positioning member after a predetermined axial movement of the axially movable member, and a return spring arranged to return the axially movable member to released position after each brake application, said spring being compressed between two members which remain equidistant in released position regardless of the position of the axially movable member with respect to the fixed member.

6. For use in a disc brake having an axially fixed member and an axially movable member which moves a distance at least partially dependent upon the amount of brake wear, means for automatically changing the released position of the axially movable member to maintain a substantially constant brake clearance comprising an axially extending pin secured to the axially movable member, spacing means associated with said pin, and a washer encircling said pin and having inwardly projecting resilient prongs which are at an angle to the plane of the washer and which engage the outer surface of the pin, said prongs also being engageable with one portion of said spacing means for relieving the engagement of said prongs with said pin, said prongs normally causing the washer and pin to move together axially, except when the washer engages said spacing means.

PAUL A. DRISCOLL.

REFERENCES CITED

The following references are of record in the file of this patent:

UNITED STATES PATENTS

| Number | Name | Date |
|---|---|---|
| 2,349,132 | Baird | May 16, 1944 |
| 2,384,297 | Goepfrich | Sept. 4, 1945 |